E. J. GULICK.
SLIP COUPLING.
APPLICATION FILED JULY 11, 1907.
923,043.
Patented May 25, 1909.
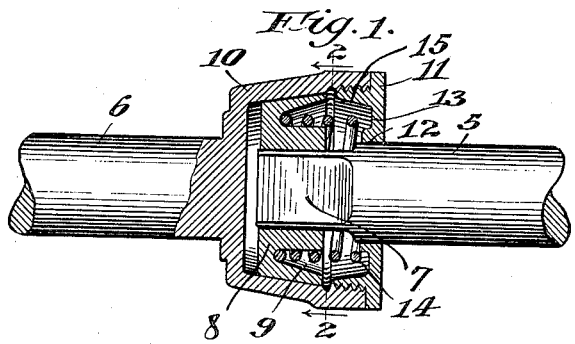
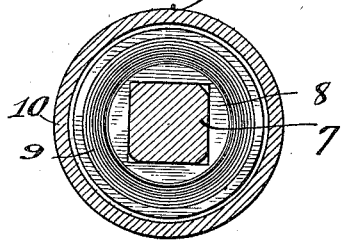
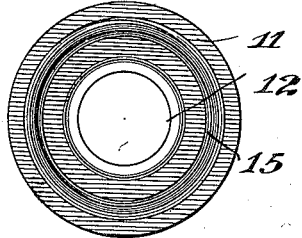
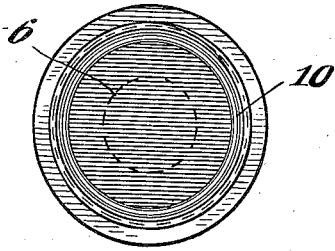
Witnesses,
F. S. Mann
James R. Offield.
Inventor,
Edward J. Gulick.
By Offield, Towle & Linthicum
Attys.

UNITED STATES PATENT OFFICE.

EDWARD J. GULICK, OF MISHAWAKA, INDIANA.

SLIP-COUPLING.

No. 923,043.

Specification of Letters Patent.

Patented May 25, 1909.

Application filed July 11, 1907. Serial No. 383,250.

*To all whom it may concern:*

Be it known that I, EDWARD J. GULICK, a citizen of the United States, residing at Mishawaka, in the county of St. Joseph and State of Indiana, have invented certain new and useful Improvements in Slip-Couplings, of which the following is a specification.

This invention relates to shaft couplings of that character which are designed to afford a slip between a driving and a driven member to prevent breakage or other injury in the event that an abnormal strain is imposed upon the driven member.

My invention has been designed more especially for use in connection with pumps such as are employed for the circulation of water within the radiation pipes of an automobile. It frequently occurs, for various reasons, that a pump employed for this purpose becomes jammed or clogged, resulting in the breaking of the shaft or the gearing driving the same, or the pump itself, and hence it is desirable to provide between the motor and pump shafts a slip connection that will permit the motor shaft to run independently when, for any reason, the pump fails to work properly. It will be obvious, however, that my invention is capable of application broadly to any situation wherein a slip coupling is desirable in a shaft or between two alined shafts connected respectively to the motor and the load.

In the drawings, Figure 1 is a vertical longitudinal section of my clutch; Fig. 2 is a cross section on line 2—2 of Fig. 1, looking in the direction of the arrow; Fig. 3 is an interior view of the cap; and Fig. 4 is an end elevation of the female member in Fig. 1.

Referring now more specifically to the drawing, 5 and 6 represent the driving and driven members, respectively, the former being connected by a gear or the like to a driven portion of the engine and provided with a square head 7 adapted to be seated in a suitable socket in the male member 8 of the clutch coupling. The male member 8 may be composed of any suitable material, either metal or composition, and is provided in one face with an annular seat 9 for a purpose that will be hereinafter described.

Preferably formed integral with the driven member 6 is the female member 10 of the clutch coupling, the open inner edge of the female member being threaded to receive a cap 11 provided with a rounded aperture 12 therein through which the driving member 5 passes and rotates therein without rotating the cap.

The cap is provided with an annular seat 13 on its inner face, and when the parts are assembled a spring 14 is placed within the annular seat 9, the cap 11 having been placed on the driving member 5, and said cap having a threaded flange 15 adapted to coöperate with the threads on the female member so that it may be screwed within the same and thereby compress the spring to properly seat the male member 8.

The driven member 6 may be suitably connected to a pump or other load, and it will be thus readily seen that when the driven member 6, for any reason, is prevented from rotating, the frictional engagement between the male and female members will not be sufficient to continue to drive the driven member so as to cause any damage; in other words, the tension of the spring may be regulated by adjusting the cap so that the tension will be only sufficient to hold the clutch members in engagement for the necessary drive of the driven member, and as soon as a harder drive is required a slippage will occur in the coupling and thereby permit the male member to rotate within the female member allowing the engine to continue to rotate the member 5 without any serious result thereto or to any of the working parts.

It is obvious that the relation of the male and female members of the coupling to the shafts 5 and 6 might be transposed, and that the construction might be otherwise varied in minor details without departing from the spirit of the invention or sacrificing any of the advantages thereof.

I claim:

In a slip coupling, the combination with driving and driven shafts located in endlong alinement, of male and female coupling members carried by the adjacent ends of said shafts, respectively, said male member having an annular spring seat therein, an abutment member surrounding said driving shaft and having screw-threaded engagement with the open end of said female coupling member, said abutment member also having an annular spring seat therein, and a coiled compression spring interposed between said male coupling member and abutment member and engaging at its ends the seats thereof, substantially as described.

EDWARD J. GULICK.

Witnesses:
L. R. ROBER,
J. R. AUSTIN.